(12) United States Patent
Hüger et al.

(10) Patent No.: US 11,250,706 B2
(45) Date of Patent: Feb. 15, 2022

(54) METHOD FOR OPERATING A PARKING ASSISTANCE SYSTEM OF A TRANSPORTATION VEHICLE WITH SPECIFICATION OF A DIRECTION OF TRAVEL FOR A PARKING MANEUVER AND PARKING ASSISTANCE SYSTEM

(71) Applicant: VOLKSWAGEN AKTIENGESELLSCHAFT, Wolfsburg (DE)

(72) Inventors: Philipp Hüger, Rühen (DE); Bastian Göricke, Wolfsburg (DE)

(73) Assignee: VOLKSWAGEN AKTIENGESELLSCHAFT

( * ) Notice: Subject to any disclaimer, the term of this patent is extended or adjusted under 35 U.S.C. 154(b) by 180 days.

(21) Appl. No.: 16/717,359

(22) Filed: Dec. 17, 2019

(65) Prior Publication Data
US 2020/0193825 A1 Jun. 18, 2020

(30) Foreign Application Priority Data
Dec. 17, 2018 (DE) .................. 10 2018 221 871.4

(51) Int. Cl.
*G08G 1/14* (2006.01)
*G05D 1/00* (2006.01)
(Continued)

(52) U.S. Cl.
CPC .......... *G08G 1/143* (2013.01); *G05D 1/0044* (2013.01); *G05D 1/0212* (2013.01);
(Continued)

(58) Field of Classification Search
CPC ...... G08G 1/143; G08G 1/0125; G08G 1/145; G05D 1/0044; G05D 1/0212; G05D 2201/0213
See application file for complete search history.

(56) References Cited

U.S. PATENT DOCUMENTS 9,400,897 B2 7/2016 Brüning et al.
9,522,675 B1 * 12/2016 You .................... B62D 15/0285
(Continued)

FOREIGN PATENT DOCUMENTS

DE 102011113916 A1 3/2013
DE 102014210043 A1 10/2015

*Primary Examiner* — Yazan A Soofi
*Assistant Examiner* — Naeem Taslim Alam
(74) *Attorney, Agent, or Firm* — Barnes & Thornburg LLP

(57) ABSTRACT

A method for the operation of a parking assistance system of a transportation vehicle in which a parking space in a surroundings of the transportation vehicle is recognized with reference to sensor data of at least one surroundings sensor of the transportation vehicle and a predetermined parking space category is assigned to the parking space, and a parking maneuver into the parking space with the assigned parking space category is offered to a user of the transportation vehicle, wherein parking space surroundings data that describe a location of the parking space and/or a surroundings of the parking space are determined, a driving direction along which the transportation vehicle will be maneuvered into the parking space is determined with reference to the parking space surroundings data, and the parking maneuver along the determined driving direction is offered to the user.

16 Claims, 3 Drawing Sheets

(51) Int. Cl.
  *G08G 1/01* (2006.01)
  *G05D 1/02* (2020.01)
(52) U.S. Cl.
  CPC .......... *G08G 1/0125* (2013.01); *G08G 1/145* (2013.01); *G05D 2201/0213* (2013.01)

(56) References Cited

U.S. PATENT DOCUMENTS

| | | |
|---|---|---|
| 2005/0049766 A1 | 3/2005 | Tanaka et al. |
| 2013/0085636 A1 | 4/2013 | You et al. |
| 2014/0292542 A1* | 10/2014 | Bruning ............... B62D 15/028 340/932.2 |
| 2016/0046285 A1* | 2/2016 | Kim ................. G08G 1/096775 340/932.2 |
| 2017/0092130 A1 | 3/2017 | Bostick et al. |
| 2019/0016331 A1* | 1/2019 | Carlson ................. B60W 30/06 |
| 2019/0228375 A1* | 7/2019 | Laury .................. G05D 1/0088 |
| 2019/0276011 A1* | 9/2019 | Eshima ................ G05D 1/0088 |
| 2020/0384987 A1* | 12/2020 | Preissler ............... B60W 50/14 |

\* cited by examiner

METHOD FOR OPERATING A PARKING ASSISTANCE SYSTEM OF A TRANSPORTATION VEHICLE WITH SPECIFICATION OF A DIRECTION OF TRAVEL FOR A PARKING MANEUVER AND PARKING ASSISTANCE SYSTEM

PRIORITY CLAIM

This patent application claims priority to German Patent Application No. 10 2018 221 871.4, filed 17 Dec. 2018, the disclosure of which is incorporated herein by reference in its entirety.

SUMMARY

Illustrative embodiments relate to a method for the operation of a parking assistance system of a transportation vehicle in which a parking space in the surroundings of the transportation vehicle is recognized with reference to sensor data of at least one surroundings sensor of the transportation vehicle and a predetermined parking space type is assigned to the parking space. In addition, a parking maneuver into the parking space with the assigned parking space type is offered to a user of the transportation vehicle. Illustrative embodiments additionally relate to a parking assistance system for a transportation vehicle.

BRIEF DESCRIPTION OF THE DRAWINGS

An exemplary embodiment is described below. Here.

DETAILED DESCRIPTION

Figure 1:
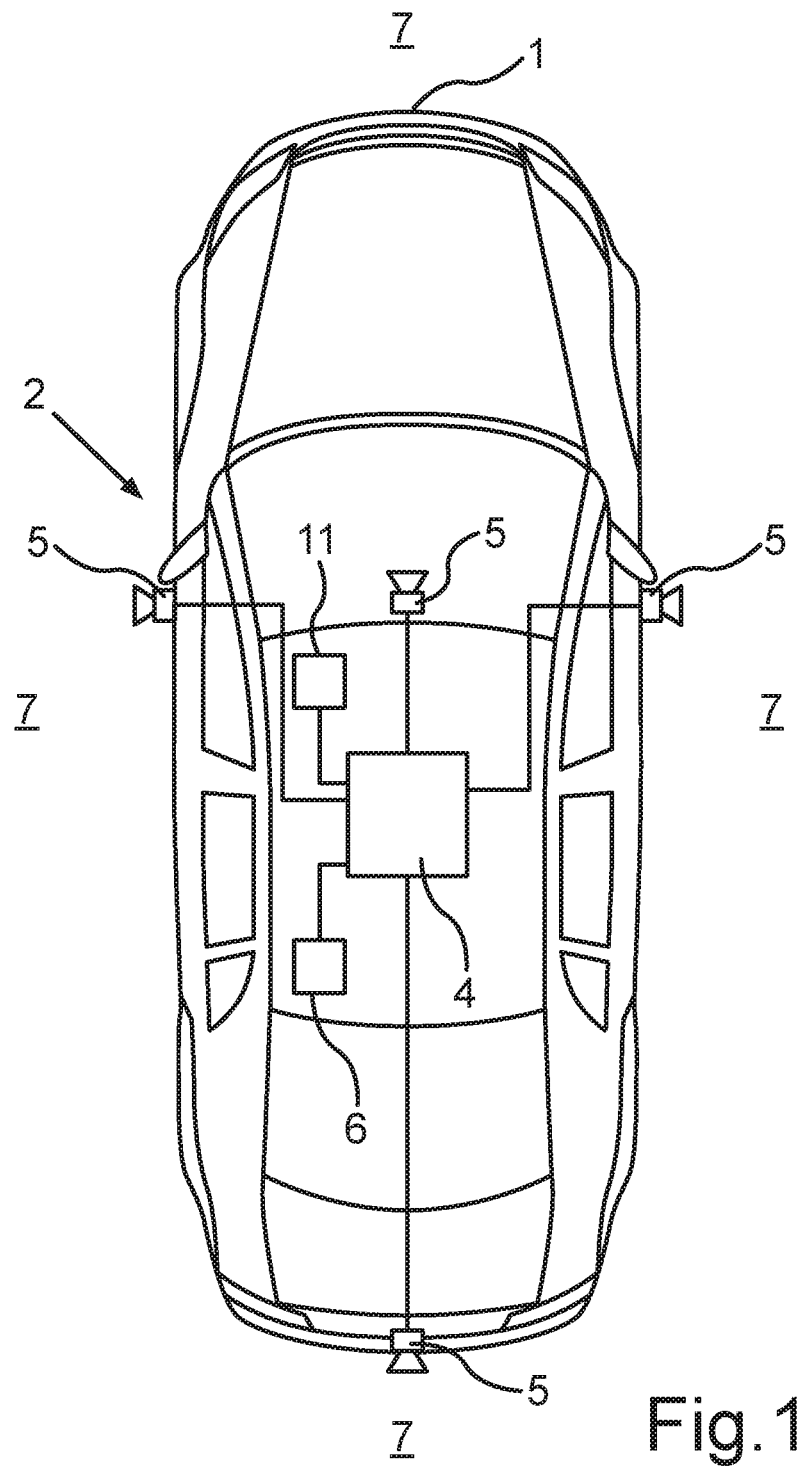
FIG. 1 shows a schematic illustration of a transportation vehicle that comprises a parking assistance system.

Numerous driver assistance systems which assist a driver or a user of the transportation vehicle when maneuvering the transportation vehicle are known from the prior art. In the present case, the interest concerns what are known as parking assistance systems, which can also be referred to as park steering assistants. Such a parking assistance system can recognize and appropriately survey a parking space in a surroundings of the transportation vehicle on the basis of sensor data from surroundings sensors. Following this, the transportation vehicle can be maneuvered into the parking space, semi-automatically or fully automatically, with the aid of the parking assistance system. The transportation vehicle can here be parked into different parking space types, for example, parallel parking spaces, angle parking spaces or bay parking spaces. The transportation vehicle can, furthermore, be parked into the parking space along different driving directions, for example, in a forward driving direction or in a reverse driving direction.

Parking assistance systems that show the user a recognized parking space and offer the user a parking maneuver into the parking space are known from the prior art. The user can then choose between the different parking space types and/or the driving directions through a corresponding actuation of an operating element or a button. In more modern parking assistance systems, the most probable parking space type for the parking space can be determined, and this is offered to the user immediately. It is then possible to switch between further parking space types through an appropriate pressing of a button. A distinction between forward parking into a bay parking space and reverse parking into a bay parking space is at present only made possible through an appropriate actuation of the operating element or of the button.

US 2013/0085636 A1 describes in this connection a parking control apparatus by which a left-hand region and a right-hand region are acquired by a left-hand ultrasonic sensor and a right-hand ultrasonic sensor as a vehicle moves, and a left-hand image for the left-hand region and a right-hand image for the right-hand region are recorded by at least one camera. On the basis of left-hand ultrasonic data and the left-hand image for the left-hand region and right-hand ultrasonic data and the right-hand image for the right-hand region, it is possible to assess whether an available parking space is located on the left-hand or right-hand side of the vehicle, and whether the vehicle is to be parked perpendicularly or parallel.

US 2005/0049766 A1 furthermore describes an apparatus for assisting a reverse movement of a vehicle. The apparatus comprises an image acquisition device for acquiring an image of an external region behind the vehicle. The apparatus also comprises a method or mechanism for assessing whether a type of parking through the reverse movement of the vehicle is a reverse parking or a parallel parking. The apparatus also comprises a display device for displaying the image acquired by the image acquisition device and for the overlaid display of a target parking position on the acquired image.

A method for the classification of parking scenarios for a parking assistance system of a transportation vehicle is furthermore known from US 2014/0292542 A1. A predefined number of parking scenarios is defined here, wherein each parking scenario is described by a predefined number of criteria typical of the parking scenario. The criteria are here based at least on parameters specific to the parking space. It can also be provided that the criteria of the parking space scenarios are furthermore based on parameters specific to the transportation vehicle and/or parameters specific to the driver and/or earlier parking scenarios and/or navigation data.

Disclosed embodiments indicate a solution as to how a safer and more convenient operation of the transportation vehicle can be enabled with a parking assistance system of the type mentioned at the beginning.

This is achieved by the disclosed method and by the disclosed parking assistance system.

A disclosed method is used for the operation of a parking assistance system of a transportation vehicle. A parking space in a surroundings of the transportation vehicle is recognized here with reference to sensor data of at least one surroundings sensor of the transportation vehicle. A predetermined parking space type is also assigned to the parking space on the basis of the sensor data. In addition, a parking maneuver into the parking space with the assigned parking space type is offered to a user of the transportation vehicle. Parking space surroundings data that describe a location of the parking space and/or a surroundings of the parking space are also determined. A driving direction along which the transportation vehicle will be maneuvered into the parking space is determined with reference to the parking space surroundings data, and the parking maneuver along the determined driving direction is offered to the user.

A driver, or the user, of the transportation vehicle should be assisted when parking the transportation vehicle into a parking space with the aid of the parking assistance system. The parking assistance system can comprise at least one surroundings sensor with which the sensor data that describe the surroundings of the transportation vehicle can be provided. It can also be provided that the parking assistance system comprises a plurality of surroundings sensors. The at least one surroundings sensor can be an ultrasonic sensor, a radar sensor, a lidar sensor or a camera. These sensor data can then be transferred to an appropriate computing device or a control unit of the parking assistance system. The parking space can be recognized in the surroundings on the basis of the sensor data. It can also be provided that relevant objects, parked transportation vehicles, for example, that border the parking space are recognized. The parking space type of the recognized parking space can in addition be determined on the basis of the sensor data. The parking space type can, for example, describe whether the parking space is a bay parking space, a parallel parking space or an angle parking space. The parking space type can then be recognized on the basis of the sensor data, for example, with reference to the spatial dimensions of the parking space and/or the objects bordering the parking space. The parking space type can in addition be recognized with reference to an orientation of further transportation vehicles that are parked on neighboring parking spaces. The parking space can also be classified in this way.

It is in addition provided that information relating to the recognized parking space and its parking space type is output to the user or driver of the transportation vehicle. A corresponding display can, for example, be provided indicating that a parking space has been recognized, and the parking space type to which this parking space has been assigned. The parking procedure into this recognized parking space can also be offered to the user. The user can thus be asked whether he wants the transportation vehicle to be parked into the recognized and classified parking space. If the user does want this, he can, for example, effectuate a corresponding operating input. Following this, the transportation vehicle can then be parked into the parking space at least semi-automatically by the parking assistance system. The parking maneuver in which the parking assistance system at least manipulates the steering and parks the transportation vehicle along a to the predetermined parking trajectory into the parking space is thus carried out. It can be provided here that the driver continues to operate the accelerator pedal and the brakes. It can also, however, be provided that the transportation vehicle is parked into the parking space fully automatically, and that the parking assistance system manipulates a drive motor and/or a braking system.

According to an exemplary embodiment, the parking space surroundings data are also determined. These parking space surroundings data describe the location of the parking space and/or a surroundings of the parking space. It is possible, in other words, to determine the position at which the parking space is located with reference to the parking space surroundings data. Alternatively or in addition it is possible to determine what is located in the surroundings of the parking space on the basis of the parking space surroundings data. It is thus possible to further characterize the parking space. The driving direction along which the transportation vehicle will be maneuvered into the parking space can then be determined on the basis of the parking space surroundings data. The driving direction can be the forward driving direction or the reverse driving direction. It is thus possible to decide whether the transportation vehicle will be maneuvered forward or in reverse into the parking space in the parking maneuver on the basis of the parking space surroundings data. The direction in which the transportation vehicle is parked into the parking space can thus be determined specifically for the location or depending on a surroundings scenario. It can be provided that the most probable or most expedient driving direction for the parking space is determined on the basis of the parking space surroundings data. It is provided here that, in addition to the recognized parking space and its parking space type, the driving direction is also offered to the user. In contrast to known methods, it is thus not required that the user must choose the driving direction for the parking maneuver through a corresponding operating input. The assistance provided to the user by the parking assistance system can thus be designed more conveniently. The safety as a whole can also be increased through the improved assistance.

The driving direction may be determined if a bay parking space is assigned to the parking space as the parking space type. If it is recognized that the parking space is a bay parking space, the driving direction can also be determined. It is thus possible to decide whether the transportation vehicle will be maneuvered into the parking space in the forward driving direction or in the reverse driving direction. If the parking space is an angle parking space, it can be provided that the transportation vehicle is maneuvered into the parking space in the forward driving direction. It can also be provided here that the transportation vehicle is maneuvered into an angle parking space in the direction of an exit, to simplify the exit. Such an angle parking space can also be referred to as a fishbone parking space. In the case of a parallel parking space, it is additionally possible to distinguish whether the transportation vehicle will be maneuvered into the parking space in the forward driving direction or in the reverse driving direction. In the case of a parallel parking space, it is additionally possible to check on which side of a carriageway, with reference to the driving direction, the transportation vehicle should be parked. It is possible here, for example, on the basis of the parking space surroundings data, to determine that the carriageway or the road on which the transportation vehicle is currently located is a one-way street. In this case the transportation vehicle can be parked either into a parking space on the right-hand side or into a parking space on the left-hand side of the carriageway.

The parking space surroundings data may be determined with reference to the at least one surroundings sensor, with reference to a position determination system and/or on the basis of swarm data. Parking space surroundings data can thus be determined on the basis of the sensor data that are provided with the at least one surroundings sensor. As already explained, the at least one surroundings sensor can be a camera. Corresponding images or video data can then be provided with this camera as sensor data. These images can then be used to recognize relevant objects, devices or the like in the surroundings of the parking space. Data from a position determination system can additionally be used, to determine the parking space surroundings data. The position determination system can, for example, be a satellite-based position determination system. It can here also be provided that information from a digital map is used to determine devices, businesses or the like in the surroundings of the parking space. It can also be provided that swarm data are used for the determination of the parking space surroundings data. Altogether, a reliable determination of the parking space surroundings data, and thus of the driving direction, can thus be enabled.

In a further disclosed embodiment, it is recognized with reference to the parking space surroundings data, that access to a luggage compartment of the transportation vehicle is necessary after the parking maneuver has been carried out. The driving direction can also be determined depending on the required access to the luggage compartment. It is provided here that it is recognized that the access to the luggage compartment is necessary if the parking space surroundings data describe a retail business in the surroundings of the parking space. It is possible, for example, to recognize on the basis of the parking space surroundings data, that the parking space is located in the car park of a retail business, for example, a supermarket or a DIY store. It is possible to conclude from this that a user of the transportation vehicle will make purchases in the retail business and that the luggage compartment will then be loaded. It is provided here that the transportation vehicle is maneuvered into the parking space in the forward driving direction. In other words, the transportation vehicle is parked in the parking space in such a way that the access to the luggage compartment can be enabled. In the same way it can be provided that, for example, on the basis of the parking space surroundings data, it is recognized that the parking space is at a recycling center. Bearing this in mind, it can then be concluded that the user of the transportation vehicle wishes to unload objects that are to be disposed of from the luggage compartment. In this case the transportation vehicle can be maneuvered into the parking space in the forward driving direction. The convenience of using the transportation vehicle can thus be increased.

In a further disclosed embodiment, the parking space surroundings data describe a current traffic density on a carriageway adjacent to the parking space, and the driving direction is determined depending on the traffic density. As described previously, the data of a position determination system and/or digital maps can be used to determine the traffic density. It is possible to derive from this whether the parking space is located on a main road with heavy traffic or on a quieter side road. It can in addition be provided that the parking space surroundings data, or the traffic density, is determined on the basis of currently received traffic information. It can also be provided that data of the at least one surroundings sensor is used. In this case it is possible to conclude, for example, on the basis of the image of a camera, that the road has heavy traffic. The forward driving direction can be chosen as the driving direction for a parallel parking space on a busy road, to hold up the following traffic as little as possible. This is to be taken into account when the parallel parking space is sufficiently long. The driving direction that is proposed to the user for the parking maneuver can thus be determined depending on a surroundings scenario or on a traffic density.

It is provided here that a reverse driving direction is determined as the driving direction if it is recognized with reference to the surroundings data that heavy traffic is present on the carriageway adjacent to the parking space. If the parking space is recognized as a bay parking space, the transportation vehicle can be maneuvered into the parking space in the reverse driving direction if the high traffic density is recognized. This high traffic density can be appropriately predefined. In the case of this high traffic density, or of a road with heavy traffic, to which the parking space is adjacent, a fast exit into the flowing traffic after parking is enabled by parking in the reverse driving direction. The safety of operating the transportation vehicle can be increased in this way.

According to a further disclosed embodiment, the driving direction is determined with reference to preference data of the user, wherein the preference data describe a preference of the user for the driving direction and/or a driving direction stipulated by the user for the parking space or a different parking space in the surroundings. The preference data can, for example, be determined on the basis of manual parking maneuvers of the driver carried out previously. The preference data can, further, be determined on corresponding operating inputs for operating the parking assistance system. The preference data can, for example, describe how the user, or the driver of the transportation vehicle, usually likes to park in a parking space of a corresponding parking space type. For parking spaces that are used by the user multiple times, a corresponding history can be ascertained and taken into account when determining the driving direction. It is possible, for example, here to derive the driving direction in which the user parks the transportation vehicle in a parking space that is assigned to his house or his apartment, or in a parking space at his place of work, from the preference data. If, for example, the parking space is part of a parking lot, it is possible to ascertain how the user has already parked the transportation vehicle in a parking space of the parking lot from the preference data or from the history. It can be provided here that the check as to whether a preference of the user for the parking space is present, or whether the driving direction can be ascertained on the basis of the preference data, is prioritized. In this way a virtually self-learning system can be provided to determine the driving direction.

According to a further disclosed embodiment, the driving direction is determined with reference to swarm data, wherein the swarm data describe driving directions chosen by other transportation vehicles for parking into the parking space and/or in another parking space in the surroundings. In other words, the optimum parking method for the respective location of the parking space can be loaded and automatically selected from a swarm map.

According to a further disclosed embodiment, a target position of the transportation vehicle in the parking space is determined for the parking maneuver. This target position can be determined on the basis of the sensor data and/or the parking space surroundings data. The surroundings scenario can, for example, be detected. The optimum final position, or the target position for the transportation vehicle, can be determined from the detected scenario and/or from objects that border the parking space and that are recognized. This target position can, for example, describe the parking depth, the orientation and/or the driving direction. This target position can be chosen such that getting out of the transportation in an ideal manner can be enabled for the driver or the user. If there are multiple occupants in the transportation, the target position can be appropriately adjusted. The data from seat occupancy sensors can be used for this purpose.

It can also be provided that an occupancy of the luggage compartment is determined to determine the driving direction for the parking maneuver into the parking space. It is also possible to check whether the luggage compartment of the transportation vehicle was loaded before carrying out the parking maneuver. Appropriate loading sensors or chassis sensors can, for example, be used for this purpose. It is also possible to check whether a hatch of the luggage compartment has been opened and then closed again. In this case, it can be assumed that the user has correspondingly loaded the luggage compartment, and would probably like to unload the luggage compartment after the parking maneuver. The driving direction can here be chosen in such a way that the driver is given access to the luggage compartment.

A disclosed parking assistance system for a transportation vehicle is designed to carry out the exemplary method and the disclosed embodiments thereof. The parking assistance system can comprise a computing device or a control unit. This computing device can receive the sensor data from the at least one surroundings sensor. The control device can, in addition, receive data from a position determination system or from a digital map. It can also be provided that the computing device can receive traffic data or swarm data. An appropriate computer program can be made to run on the computing device to carry out the method.

An exemplary transportation vehicle comprises a disclosed parking assistance system. The transportation vehicle can be designed as a passenger transportation vehicle or as a commercial transportation vehicle. The disclosed embodiments and their benefits presented previously in connection with the disclosed method apply correspondingly to both the disclosed parking assistance system and to the disclosed transportation vehicle.

In the exemplary embodiment, the described components each represent single features that are to be considered independently of one another, each of which also develops the disclosure independently of one another, and are thus also to be considered individually, or in a combination other than that illustrated, as elements of the disclosure. The embodiment described can, moreover, also be extended through more of the features already described.

Elements with the same function are each given the same reference signs in the figures.

FIG. 1 shows a plan view of a transportation vehicle 1 which, in the present case, is designed as a passenger transportation vehicle. The transportation vehicle 1 comprises a parking assistance system 2. This parking assistance system 2, which can also be referred to as a park steering assistant, has the purpose of assisting a user or driver of the transportation vehicle 1 when parking the transportation vehicle 1 into a parking space 3. The parking assistance system 2 comprises an electronic computing device 4. The electronic computing device 4 can, for example, be formed by a control unit of the transportation vehicle 1. The parking assistance system 2 furthermore comprises at least one surroundings sensor 5. In the present exemplary embodiment, the parking assistance system 2 comprises four surroundings sensors which are arranged, distributed around the transportation vehicle 1. In the present example, the surroundings sensors 5 are designed as cameras. Sensor data that describe a surroundings 7 of the transportation vehicle 1 can be provided with the surroundings sensors 5. These sensor data can be transferred from the respective sensors 5 or the cameras to the computing device 4. The parking assistant system 2 further comprises a receiving device 6 by which, for example, position data of the position determination system can be received. Information from a digital map can, moreover, be received with the receiving device 6. Swarm data can also be received with the receiving device 6. The parking assistance system 2 also comprises a display device 11 by which a display can be provided to the user of the transportation vehicle 1.

Figure 2:
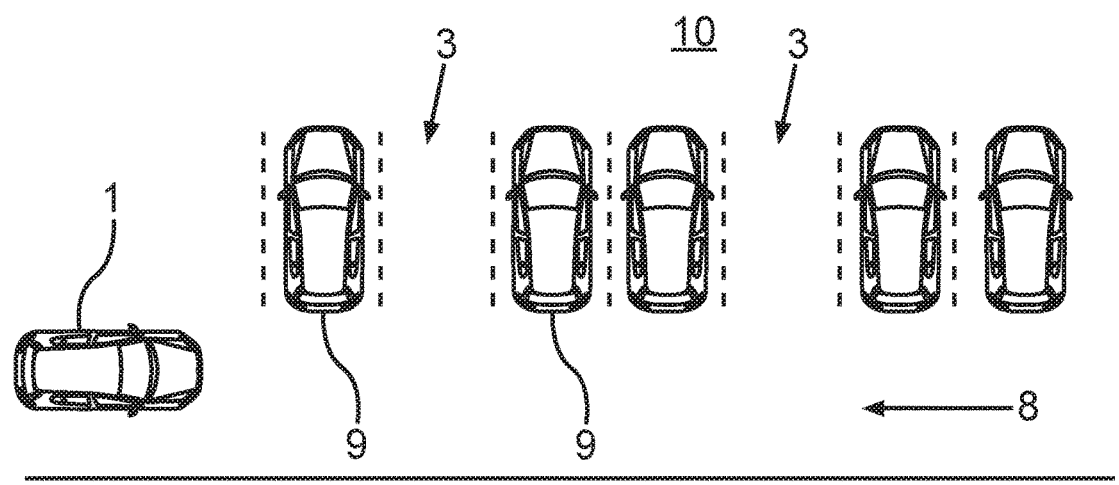
FIG. 2 shows the transportation vehicle located on a carriageway wherein bay parking spaces are adjacent to the carriageway.

FIG. 2 shows the transportation vehicle 1, which is located on a carriageway 8 or is maneuvering on the carriageway 8. The parking assistance system 2 can be activated while the transportation vehicle 1 is driving on the carriageway 8. This can, for example, take place through an appropriate operating input of the user. As a result of the activation of the parking assistance system, it is possible to search for free parking spaces 3 by the parking assistance system 2. The free parking spaces 3 can be recognized the sensor data that are provided by the surroundings sensors 5. The free parking spaces 3, or objects 9 that border the parking space 3, can here be recognized the sensor data. In the present case the objects 9 that border the parking space 3 are parked transportation vehicles.

In addition to the sensor data, parking space surroundings data are determined by the computing device 4. These parking space surroundings data describe a surroundings 10 of the recognized parking space 3. The parking space surroundings data can, for example, describe the location of the parking space 3. The parking space surroundings data can furthermore describe a surroundings scenario in the surroundings 10 of the parking space 3. The parking space surroundings data can here, for example, describe corresponding establishments, for example, retail businesses or the like, in the surroundings 10 of the parking space 3. A parking space type of the recognized parking space 3 can additionally be recognized on the basis of the sensor data. The parking space type can, for example, describe whether the parking space 3 is a parallel parking space, a bay parking space or an angle parking space. In the present exemplary embodiment, the free parking space 3 is a bay parking space.

The presence of the free parking space 3 is recognized on the basis of the sensor data. The parking space 3 is in addition classified in terms of a parking space type. It is now further provided that, on the basis of the parking space surroundings data, a driving direction along which the transportation vehicle 1 should be maneuvered during the parking maneuver into the parking space 3 is determined. The driving direction can be a forward driving direction or a reverse driving direction. After the driving direction has been determined, the user or the driver of the transportation vehicle 1 can be shown that a free parking space 3 has been recognized and that the type of the parking space 3 has also been recognized. It is provided in addition that a parking maneuver into this free parking space along the previously determined driving direction is offered to the driver.

Figure 3:
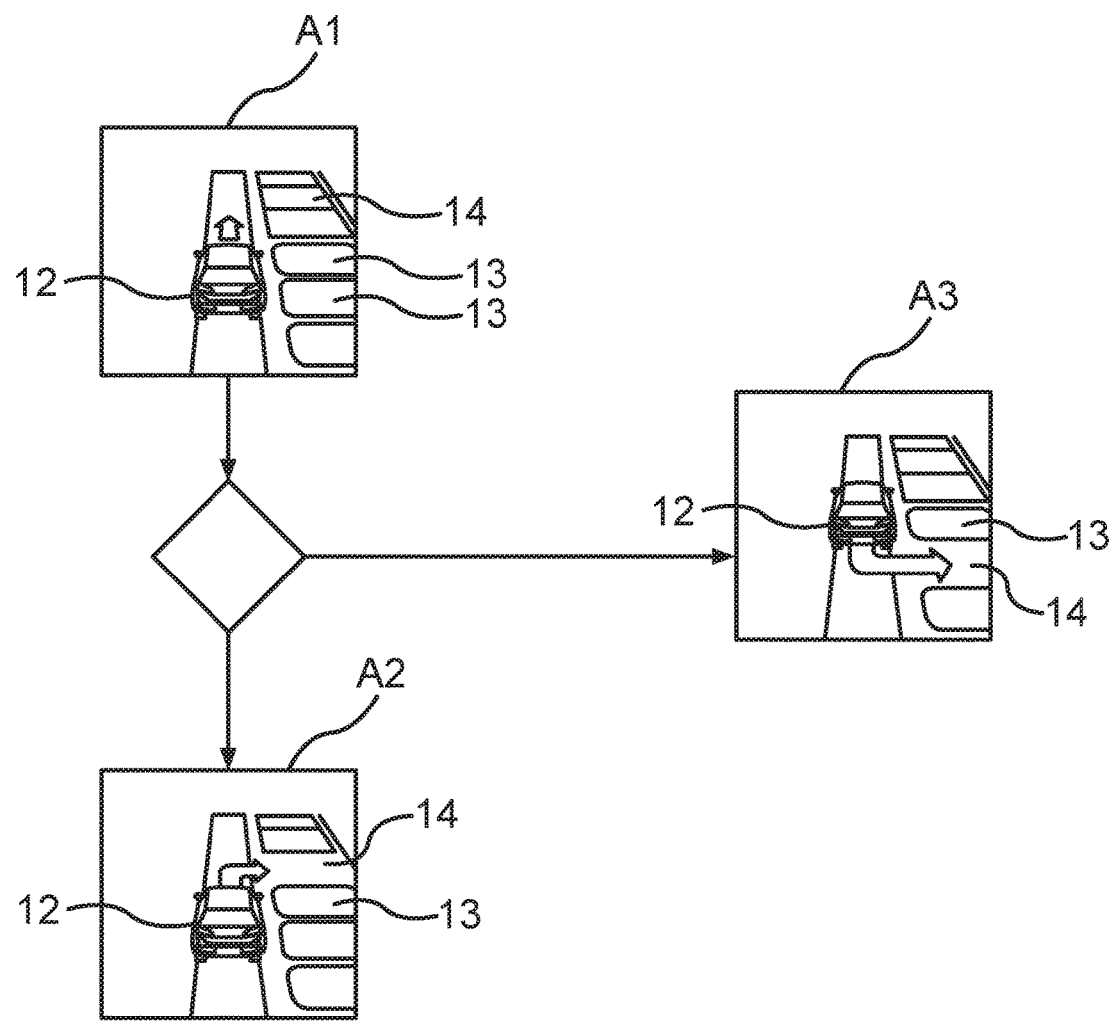
FIG. 3 shows different selection options for parking maneuvers that can be offered to a user of the transportation vehicle.

In this connection, FIG. 3 shows a first display A1 that can be shown to the user on the display device 11 of the transportation vehicle 1 or of the parking assistance system 2. This first display A1 shows an image 12 of the transportation vehicle 1 as well as corresponding images 13 of the objects 9 that border the parking space 3 or the parked transportation vehicles. Images of the parking spaces 3 are further shown on the display A1. Depending on the parking space surroundings data, a decision is now made as to whether the transportation vehicle 1 should be parked into the recognized bay parking space in the forward driving direction or in the reverse driving direction. In a first scenario it is, for example, recognized on the basis of the parking space surroundings data, that the parking space is located on a parking lot of a supermarket. It can be assumed here that the user of the transportation vehicle 1 will make purchases in the supermarket and then would like to load a luggage compartment 15 of the transportation vehicle. From this it is determined that the transportation vehicle 1 should be maneuvered along the forward driving direction into the parking space 3. In this case, the parking maneuver into the bay parking space along the forward driving direction is offered to the driver. The display A2 is shown to the user for this purpose.

In a different scenario it can be decided that the transportation vehicle 1 should be parked into the parking space 3 along the reverse driving direction. This is, for example, the case when it is recognized on the basis of the parking space surroundings data that the carriageway 8 is a road with a high traffic density. In this case the transportation vehicle 1 is first parked into the parking space 3 in the reverse driving direction, so that a rapid exit into the flowing traffic can be made possible after parking. In this case the third display A3 is shown to the user. As soon as the user has selected an appropriate parking maneuver, the transportation vehicle 1 can be parked into the parking space 3 at least semi-automatically by the parking assistance system.

Figure 4:
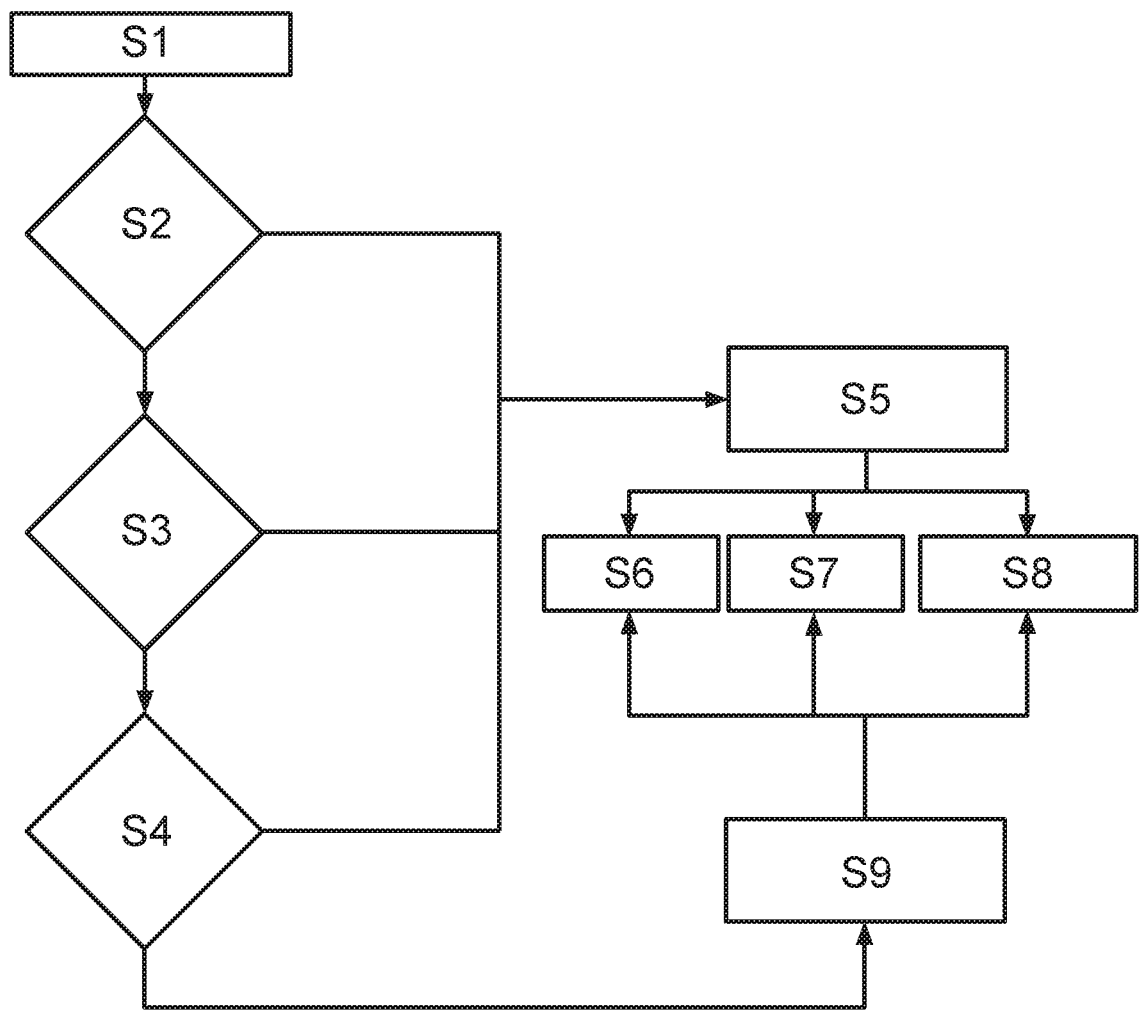
FIG. 4 shows a schematic flow diagram of a method for operating the parking assistance system.

FIG. 4 shows a schematic flow diagram of a method for operating the parking assistance system 2. The parking space 3 is recognized here in an operation at S1. A check is made in an operation at S2 as to whether a preference of the user is present for the current location or the surroundings 10 of the parking space 3. Corresponding preference data of the user that are stored can be referred to for this purpose. These preference data can describe corresponding preferences of the user in relation to the driving direction. If this customer preference is present, the method can be continued in an operation at S5. The parking maneuver with the driving direction that has been determined on the basis of the preference data is offered here to the driver. If no preference data are present, the parking space surroundings data are employed, and a check is made as to whether a determination of the driving direction depending on the location or depending on the surroundings is possible (operation at S3). If this is the case, the method is continued in the operation at S5, and an appropriate parking maneuver is offered to the user. If this is not the case, a check is made in an operation at S4 as to whether the use of swarm data is possible. If this is the case, the parking maneuver can be offered to the user in operation at S5, wherein the driving direction is determined on the basis of the sensor data. If this is not the case, a parking maneuver can be offered to the driver in an operation at S9 in which he chooses the driving direction himself. With the respective parking maneuver, a distinction can be made between different parking modes. For example, parking into a bay parking space can take place in an operation at S6, parking into a parallel parking space take place in an operation at S7, and parking into an angle parking space can take place in an operation at S8.

LIST OF REFERENCE SIGNS

1 Transportation vehicle
2 Parking assistance system
3 Parking space
4 Computing device
5 Surroundings sensor
6 Receiving device
7 Surroundings
8 Carriageway
9 Object
10 Surroundings
11 Display device
12 Image of the transportation vehicle
13 Image of the object
14 Image of the parking space
15 Luggage compartment
A1 Image
A2 Image
A3 Image
S1-9 Operation

The invention claimed is:

1. A parking assistance system for a transportation vehicle for providing parking assistance the transportation vehicle, the parking assistance system comprising:
at least one surroundings sensor that generates sensor data for recognition of a parking space in surroundings of the transportation vehicle with reference to the sensor data; and
a control unit that is configured to assign a predetermined parking space category to the recognized parking space,
wherein the control unit is further configured to offer a parking maneuver to a user of the transportation vehicle for parking into the parking space having the assigned parking space category,
wherein parking space surroundings data that describe a location of the parking space and/or a surroundings of the parking space are determined, a driving direction along which the transportation vehicle is configured to be maneuvered into the parking space is determined with reference to the parking space surroundings data, and the parking maneuver along the determined driving direction is offered to the user,
wherein the parking space surroundings data describe a current traffic density on a carriageway adjacent to the parking space and the driving direction is determined based on the traffic density, and
wherein the control unit is further configured to instruct the transportation vehicle to execute the parking maneuver at least semi-automatically.

2. The parking assistance system of claim 1, wherein the driving direction is determined by the control unit in response to a bay parking space being assigned as the parking space category to the parking space.

3. The parking assistance system of claim 1, wherein the parking space surroundings data are determined with reference to the at least one surroundings sensor, with reference to a position determination system and/or based on swarm data.

4. The parking assistance system of claim 1, wherein it is recognized with reference to the parking space surroundings data that access to a luggage compartment of the transportation vehicle is necessary after carrying out the parking maneuver, and the driving direction is determined based on the necessary access to the luggage compartment.

5. The parking assistance system of claim 4, wherein it is recognized that the access to the luggage compartment is necessary in response to the parking space surroundings data describing a retail business in the surroundings of the parking space.

6. The parking assistance system of claim 1, wherein a reverse driving direction is determined as the driving direction in response to it being recognized with reference to the surroundings data that heavy traffic is present on the carriageway adjacent to the parking space.

7. The parking assistance system of claim 1, wherein the driving direction is determined with reference to preference data of the user, wherein the preference data describe a preference of the user for the driving direction and/or a driving direction stipulated by the user for the parking space or a different parking space in the surroundings.

8. The parking assistance system of claim 1, wherein the driving direction is determined with reference to swarm data, wherein the swarm data describe driving directions chosen by other transportation vehicles for parking into the parking space and/or in another parking space in the surroundings.

9. A method for the operation of a parking assistance system of a transportation vehicle wherein a parking space in a surroundings of the transportation vehicle is recognized with reference to sensor data of at least one surroundings sensor of the transportation vehicle, the method comprising:
- assigning a predetermined parking space category to the parking space;
- offering a parking maneuver into the parking space with the assigned parking space category to a user of the transportation vehicle,
- wherein parking space surroundings data that describe a location of the parking space and/or a surroundings of the parking space are determined,
- wherein a driving direction along which the transportation vehicle is configured to be maneuvered into the parking space is determined with reference to the parking space surroundings data,
- wherein the parking maneuver along the determined driving direction is offered to the user,
- wherein the parking space surroundings data describe a current traffic density on a carriageway adjacent to the parking space and the driving direction is determined based on the traffic density, and
- wherein the parking maneuver is carried out at least semi-automatically.

10. The method of claim 9, wherein the driving direction is determined in response to a bay parking space being assigned as the parking space category to the parking space.

11. The method of claim 9, wherein the parking space surroundings data are determined with reference to the at least one surroundings sensor, with reference to a position determination system and/or based on swarm data.

12. The method of claim 9, wherein it is recognized with reference to the parking space surroundings data that access to a luggage compartment of the transportation vehicle is necessary after carrying out the parking maneuver, and the driving direction is determined based on the necessary access to the luggage compartment.

13. The method of claim 12, wherein it is recognized that the access to the luggage compartment is necessary in response to the parking space surroundings data describing a retail business in the surroundings of the parking space.

14. The method of claim 9, wherein a reverse driving direction is determined as the driving direction in response to it being recognized with reference to the surroundings data that heavy traffic is present on the carriageway adjacent to the parking space.

15. The method of claim 9, wherein the driving direction is determined with reference to preference data of the user, wherein the preference data describe a preference of the user for the driving direction and/or a driving direction stipulated by the user for the parking space or a different parking space in the surroundings.

16. The method of claim 9, wherein the driving direction is determined with reference to swarm data, wherein the swarm data describe driving directions chosen by other transportation vehicles for parking into the parking space and/or in another parking space in the surroundings.

* * * * *